US 7,496,954 B1

(12) United States Patent
Himawan et al.

(10) Patent No.: US 7,496,954 B1
(45) Date of Patent: Feb. 24, 2009

(54) SINGLE SIGN-ON SYSTEM AND METHOD

(75) Inventors: Rudi Himawan, Grand Prairie, TX (US); Bharath N. Kuruvalli, Irving, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 813 days.

(21) Appl. No.: 10/994,997

(22) Filed: Nov. 22, 2004

(51) Int. Cl.
G06F 7/04 (2006.01)
(52) U.S. Cl. .......................................................... 726/8
(58) Field of Classification Search .................... 726/2, 726/8
See application file for complete search history.

(56) References Cited

U.S. PATENT DOCUMENTS

| | | | |
|---|---|---|---|
| 5,659,547 A | 8/1997 | Scarr et al. | |
| 5,742,668 A | 4/1998 | Pepe et al. | |
| 5,742,905 A | 4/1998 | Pepe et al. | |
| 6,519,647 B1 | 2/2003 | Howard et al. | |
| 6,609,115 B1 | 8/2003 | Mehring et al. | 705/51 |
| 7,350,229 B1 | 3/2008 | Lander | |
| 2002/0091639 A1 | 7/2002 | Mandahl et al. | |
| 2003/0120593 A1 | 6/2003 | Bansal et al. | |
| 2004/0034594 A1 | 2/2004 | Thomas et al. | |
| 2004/0148565 A1 | 7/2004 | Davis et al. | |

OTHER PUBLICATIONS

Allababidi, Mouaz, et al., "Integrated User Profile Administration Tool", filed Apr. 13, 2006, U.S. Appl. No. 11/403,619.
Office Action dated Mar. 17, 2008, U.S. Appl. No. 11/403,619, filed Apr. 13, 2006.
Office Action dated Apr. 25, 2008; U.S. Appl. No. 10/960,535, filed Oct. 7, 2004.
Citrix Systems, *Citrix MetaFrame Password Manager*, Apr. 22, 2004, 1 page.
Boydstun, Ken, *Security Framework Bridge*, filed Oct. 31, 2002, U.S. Appl. No. 10/284,680, Specification (45 pgs.), Drawings (3 sheets).
Boydstun, Kenneth C.., et al., *Business-To-Business Security Integration*, filed Jul. 31, 2003, U.S. Appl. No. 10/631,984, Specification (29 pgs.), Drawings (3 sheets).
Balasubramanian, Balagurunathan, et al., *Call Center Dashboard*, filed Oct. 7, 2004, U.S. Appl. No. 10/960,535, Specification (42 pages), Drawings (13 sheets).

*Primary Examiner*—Emmanuel L. Moise
*Assistant Examiner*—Ali S Abyaneh

(57) ABSTRACT

A system for single sign-on to a plurality of computing applications is provided. The system includes a plurality of enterprise applications, a policy server, and an authentication data store maintaining authentication information for the enterprise applications. The system also includes internal and external user authorization data stores that maintain user authorization information for the enterprise applications. A synchronization component synchronizes to a consolidated data store information from the internal and external authorization data stores and eliminates duplicate user information. To access a first enterprise application, the user's information is authenticated against the authentication data store and authorized against the consolidated authorization data store. To access a second enterprise application, the user is not required to sign on again since the previously entered user information is used to authenticate the user, and the consolidated data store is automatically checked to determine the user's authorization level for the second enterprise application.

22 Claims, 3 Drawing Sheets

SINGLE SIGN-ON SYSTEM AND METHOD

CROSS-REFERENCE TO RELATED APPLICATIONS

This application includes subject matter related to U.S. patent application Ser. No. 10/960,535, filed Oct. 7, 2004, entitled "Call Center Dashboard", by B. Balasubramanian, et al, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the authentication and authorization of users attempting to gain access to computer-based applications. More particularly, embodiments of the present invention provide for a single sign-on capability when authentication and authorization information is maintained in multiple disparate data stores.

BACKGROUND OF THE INVENTION

An enterprise might have multiple web-based applications that can be accessed by internal users, external users, or both. The users might be required to sign in to the applications so that the users can be authenticated and authorized. That is, when attempting to access an application, a user typically provides a user ID and a password to the application. The application might then authenticate the user by confirming that the password is correct for the user ID. After authentication, an authorization process might determine whether the user is allowed to have access to the requested application.

Authentication and authorization information for the users is typically stored in a data store such as a relational database or a directory such as a directory compliant with the Lightweight Directory Access Protocol. For example, an authentication data store might maintain a list of user IDs and corresponding passwords. When a user attempts to sign on to an application, the password provided by the user is checked against the password stored in the authentication data store for the user's user ID. If the passwords match, the user is considered authentic.

An authorization data store might maintain a list of applications to which a user is allowed access. The application to which the user has requested access can be checked against the list of applications available to the user and, if the requested application is on the list, the user can be authorized to use the application. The authentication data store and the authorization data store might be separate or might be combined into a single data store.

In some cases, an application might perform its own authentication and authorization activities by interacting directly with the authentication and authorization data stores. In other cases, a policy server or other intermediary component might receive user ID and password information from one or more applications, pass the user ID and password information to the authentication and authorization data stores, receive one or more responses from the authentication and authorization data stores, and return the responses to the applications. In either case, each application might have its own data store for authentication and authorization information. Alternatively, authentication and authorization information for more than one application might be stored in a single data store. In some cases, there might be a single authentication and authorization data store for all internal users and a separate single authentication and authorization data store for all external users.

SUMMARY OF THE INVENTION

In one embodiment, a system for single sign-on for an enterprise application is provided. The system includes a plurality of enterprise applications, and a policy server operable to receive a user's single sign-on information regarding access to a first enterprise application. The policy server also promotes communication of authentication and authorization information for the first enterprise application to determine the user's access to the first enterprise application. The policy server is operable, regarding the user accessing a second enterprise application, to authenticate the user based on the user's single sign-on information and to use the single sign-on information to obtain authorization information for the second enterprise application to determine the user's access to the second enterprise application. The system includes an authentication data store to maintain the authentication information used by the policy server related to user authentication for at least some of the plurality of enterprise applications. The system includes internal and external authorization data stores. The internal authorization data store maintains internal authorization information related to internal user and the external authorization data store maintains external authorization information related to external user. A consolidated data store maintains consolidated authorization information including both internal and external user authorization information used by the policy server related to user authorization for at least some of the plurality of enterprise applications. The system also includes a synchronization component to synchronize the internal and external authorization information from the internal and external authorization data stores, respectively, to the consolidated data store.

In another embodiment, a method for providing a single sign-on capability for a plurality of computing applications is provided. The method includes providing a first data store containing information on a first user of a computing application and providing a second data store containing information on a second user of a computing application. The method includes extracting information from the first and second data stores, translating the information from a format of the first data store and a format of the second data store into a format of a third data store. When a duplication exists between an identifying attribute for a record from the first data store and an identifying attribute for a record from the second data store, the method includes assigning a new identifying attribute to the record from the first data store. The method also provides for loading the translated information into the third data store. The method includes a user providing identifying information when the user attempts to gain access to a first computing application. The method includes comparing the identifying information provided by the user with authorization information in the third data store and authentication information in a fourth data store regarding the user's authority to access the first computing application. The method includes authorizing the user for access to the first computing application. When a user attempts to gain access to a second computing application, retrieving, without further action from the user, the identifying information provided by the user and comparing the identifying information provided by the user with authorization information in the third data store regarding the user's authority to access the second computing application. The method also includes authorizing the user for access to the second computing application.

In yet another embodiment, a system for allowing access to a plurality of web applications through a single sign-on is provided. The system includes a first data store that contains authorization information on a first user of one or more of the computing applications, and a second data store operative to contain authorization information on a second user of the computing applications. The system includes a third data store that contains authorization information on the first and second users. A fourth data store maintains authentication information related to access to the computing applications. A synchronization component translates information from a format of the first data store and a format of the second data store into a format of a third data store. When a duplication exists between an identifying attribute for a record from the first data store and an identifying attribute for a record from the second data store, the synchronization component assigns a single identifying attribute to the record and loads the translated information into the third data store. A policy server component uses the identifying information provided by a user when signing on to a first computing application and compares the identifying information to authorization information in the third data store. The policy server uses authentication information in the fourth data store to determine the user's access to the first computing application. When the user attempts to gain access to a second computing application, the policy server compares the identifying information to authorization information in the third data store without further action from the user to determine the user's access to the second computing application.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

Figure 1:
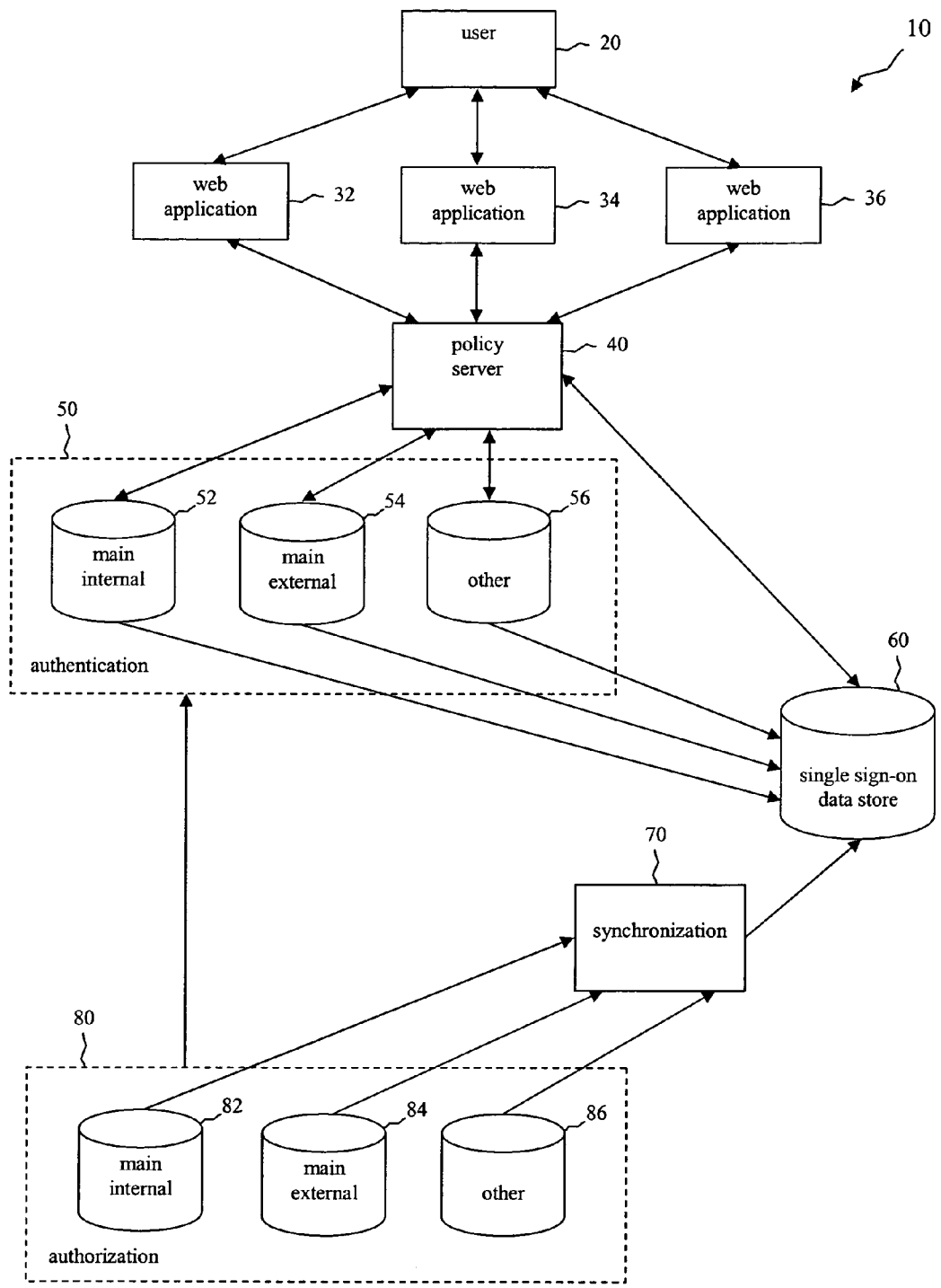
FIG. 1 is a block diagram of a system using a single sign-on data store according to one embodiment of the present disclosure.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

When a single user is allowed access to multiple applications, the user might have to sign on to each application separately. This could become tedious, time-consuming, and error prone when simultaneous access to multiple applications is needed. As an alternative to this, the concept of a single sign-on has been developed. With single sign-on, a user can sign on to one application and is thereafter automatically signed on to other applications to which he is allowed access.

A single sign-on system is typically not feasible when the authentication and authorization information is maintained in multiple disparate data stores. More specifically, for a single sign-on system to function properly, each user should have only one identifying attribute, such as a user ID number, and each identifying attribute should belong to only one user. In the case where authentication and authorization information is maintained in multiple disparate data stores, it is possible for a single user to appear in more than one data store under different user IDs. In that case, a single sign-on system might not be able to determine which authorization information should be used when the user attempts to sign in to an application. Also, it could happen that different users in different data stores have the same user ID simply by coincidence. In that case, a single sign-on system might not be able to determine which user is being referred to when that user ID is used.

Another complication with single sign-on is that a user might have different levels of authority in different applications. For example, a user who is authorized to have access to two applications might be allowed to perform a particular action in one application but might not be allowed to perform the same action in the other application. The set of actions that a user is authorized to perform within a particular application can be referred to as a role. Since a user can have different roles in different applications, an authorization policy based strictly on user ID might not properly capture role-based authorization levels. A user given the same level of authority for multiple applications might be given too much authority for his or her role in one application and not enough authority for his or her role in another application. In such a situation, a single sign-on system that takes into account roles, not simply user IDs, is needed.

Single sign-on would typically depend on the existence of a single authoritative data store containing a unique identifying attribute for each user who might use the single sign-on system. This single data store would typically need to contain role-based authorization information for each user for each application. When authentication, authorization, and role information is maintained in multiple data stores using disparate data formats, the creation of single data store containing the appropriate authentication, authorization, and role information can be problematical.

For example, replication of the disparate data stores into a single data store is typically not possible. Replication requires the establishment of an agreement between the data store from which data is to be replicated and the data store to which data is to be replicated. When the data stores use different data formats, establishing an agreement on how data should be replicated from one data store to another may pose difficulties that are not easily surmounted. For example, replicating data from a Microsoft Metadirectory Services LDAP directory to a Siemens DirX LDAP directory may be difficult. Similarly, replicating data from an Oracle relational database to a Siemens DirX LDAP directory may be difficult. Replicating data from both a Microsoft Metadirectory Services LDAP directory and an Oracle relational database to a Siemens DirX LDAP directory may be more difficult than it is worthwhile to attempt.

Another potential method for creating a single data store that contains the information needed to implement a single sign-on system is through file-based synchronization. In this approach, each disparate data store might generate a file with the information that needs to be migrated to the single data store and the generated file can then be uploaded into the single data store. This process can be repeated at regular intervals to ensure that the single data store remains up-to-date. The generated file might contain a complete dump of the data store and might be created at frequent intervals. Alternatively, a complete dump can be done at less frequent intervals with files detailing recent changes to the disparate data stores being generated and uploaded at more frequent intervals.

Uploading a complete dump of a data store at frequent intervals is a very resource intensive process. Since the majority of data in the data stores would typically not change frequently, uploading the same data on a frequent basis could be a waste of time and resources. Performing a complete dump at less frequent intervals and generating change files at more frequent intervals can be more efficient. However, the process of generating authoritative incremental change files can be difficult and might make this option less feasible.

In an embodiment, a single sign-on data store is created by transferring data from multiple individual data stores into the single sign-on data store. Since each of the individual data stores might use a different data format from the single sign-on data store, a different approach might be taken for translating data from each of the individual stores. When the single sign-on data store has been created, data related to multiple different users and applications can be retrieved from it and used to automatically authorize a user for access to any of the applications after the user has successfully signed on to any one of the applications.

FIG. 1 illustrates an embodiment of a system 10 that uses a single sign-on data store 60. A user 20 might have access to web applications 32, 34, and 36. While three web applications are shown, other numbers could be present. When the user 20 attempts to sign on to one of the applications 32, 34, or 36, user ID and password information is sent to a policy server 40. In an embodiment, the policy server 40 might be part of the Netegrity, Inc., SiteMinder authentication software package. The policy server 40 attempts to authenticate the user 20 by consulting with a set 50 of authentication data stores. The set 50 of authentication data stores contains user ID and password information for users 20 of the applications 32, 34, and 36.

In the embodiment of FIG. 1, the set 50 of authentication data stores includes a main internal data store 52, a main external data store 54, and another data store 56. The main internal data store 52 might contain the majority of the authentication information for users internal to an enterprise and the main external data store 54 might contain the majority of the authentication information for users external to an enterprise. The other data store 56 might contain other authentication information that might be used by either internal or external users. For example, the other data store 56 might contain application-specific authentication information that, for various reasons, cannot be placed in the main internal data store 52 or the main external data store 54. The other data store 56 might also contain authentication information for users 20 who use an alternate ID in addition to the ID stored in one of the main data stores 52 or 54.

While the set 50 of authentication data stores contains three data stores in the embodiment of FIG. 1, in other embodiments other numbers could be present. For example, the main internal data store 52, the main external data store 54, and the other data store 56 could be combined into a single data store. In another alternative, multiple other data stores 56 could be present.

The policy server 40 checks the user ID and password entered by the user 20 into an application 32, 34, or 36 against the user ID and password information stored in the set 50 of authentication data stores. If a match is found, the policy server 40 authenticates the user 20. In an embodiment, once the policy server 40 has authenticated a user 20, a token, such as a session cookie, is created confirming that the user has been authenticated and no further authentication is needed as long as the user remains signed on. Commercial, off-the-shelf policy servers 40 such as the SiteMinder policy server can typically authenticate large numbers of users 20 who might be using large numbers of applications and can typically search for authentication information in a large number of authentication data stores.

After the policy server 40 has authenticated a user 20, the policy server 40 seeks authorization information for the user 20 in the single sign-on data store 60. As described in greater detail below, the single sign-on data store 60 contains information regarding the authorization levels for multiple users 20 in the various roles they might hold in the applications 32, 34, and 36. The policy server 40 finds the appropriate authorization information in the single sign-on data store 60 for the role being sought by the user 20 in the application 32, 34, or 36. If the user 20 is authorized for the requested role, access to the role in the application 32, 34, or 36 is granted.

Thereafter, if the user 20 wishes to switch to another application 32, 34, or 36, the user does not need to manually enter user ID and password information. Instead, the policy server 40 might check whether a token exists indicating that the user 20 has already been authenticated. If a token exists, the appropriate authorization information is automatically retrieved from the single sign-on data store 60 and returned to the appropriate application 32, 34, or 36 without any further action needed from the user 20. In other embodiments, rather than the authorization information being retrieved from the single sign-on data store 60 every time the user 20 switches applications, the authorization information might be cached in and retrieved from the policy server 40, a web application 32, 34, or 36, or some other location, or the authorization information might be maintained in and retrieved from an internet browser cookie stored locally on the user's computer. In any case, the user 20 can easily switch from one application 32, 34, or 36 to another without additional sign-ons and is unaware of the authorization activities being carried out in the background.

Some applications 32, 34, or 36 might automatically log out a user 20 if the user 20 is inactive in the application 32, 34, or 36 for an extended period of time. For example, if a user 20 signs on to an application 32, 34, or 36 and then leaves his or her work station, an unauthorized user might be able to gain access to a secure application 32, 34, or 36 while the user 20 is away. To prevent this, an application 32, 34, 36, or the policy server 40 might automatically sign the user 20 out if no input is received over a specified period of time. The automatic sign-on capabilities of the system 10 would not override such security measures. A user 20 who is automatically logged out of an application 32, 34, or 36 would not be automatically logged in and would have to repeat the sign-on procedures described above.

In order for the single sign-on data store 60 to contain the appropriate role and authorization information, the information typically needs to be extracted from other data stores and then loaded into the single sign-on data store 60. The single sign-on data store 60 can then act as an authoritative data store that contains role and authorization information for each potential user 20 and a unique identifying attribute for each potential user 20.

In the embodiment of FIG. 1, a second set 80 of data stores contains the role and authorization information that is loaded into the single sign-on data store 60. In this embodiment, the second set 80 of authorization data stores includes a main internal data store 82, a main external data store 84, and another data store 86. The main internal data store 82 might contain the majority of the authorization information for internal users and the main external data store 84 might contain the majority of the authorization information for external users. The other data store 86 might contain other authorization information that might be used by either internal or external users. For example, the other data store 86 might contain application-specific authorization information that, for various reasons, cannot be placed in the main internal data store 82 or the main external data store 84. The other data store 86 might also contain authorization information for users 20 who use an alternate ID in addition to the ID stored in one of the main data stores 82 or 84.

While the second set 80 of authorization data stores contains three data stores in the embodiment of FIG. 1, in other embodiments other numbers could be present. For example, the main internal data store 82, the main external data store 84, and the other data store 86 could be combined into a single data store. In another alternative, multiple other data stores 86 could be present. In yet other alternatives, the set 50 of authentication data stores and the second set 80 of authorization data stores could be combined into a single data store, or the individual data stores 52, 54, 56, 82, 84, or 86 could be could be joined in various combinations.

Each of the data stores 82, 84, and 86 sends authorization and/or authentication data to a synchronization process 70 that converts data from the format of the data stores 82, 84, and 86 into a format usable by the single sign-on data store 60. The synchronization process 70 might use scripts or other software routines to assign unique identification attributes to each user and/or each user's role. Each user may have a unique number or identifier associated with each user, such as a user ID number, which is checked. When the user ID number is found in one or more of the data store 82, 84, and 86, the system determines whether the corresponding user names are also the same. Where the names are the same, then the additional attributes, such as additional roles, are added for that ID number. Where the names are different, a new ID number is generated and assigned to the user and the system administrator is notified. In an embodiment, the scripts might automatically notify the system administrator when the duplication is found.

Rules can be implemented regarding the priority of the identification numbers. For example, an enterprise might specify that internal users should be given preference in the assignment of ID numbers. That is, if an internal user and an external user are found to have the same ID number, the internal user might be allowed to keep his or her ID number and the external user might be assigned a new ID number.

This reassignment of duplicate ID numbers allows the single sign-on data store 60 to have a unique user ID number (or other identifying attribute) for each user 20 or each role for each user 20. Whenever authorization information is sought for a particular user or a particular role for a particular user, the unique user IDs ensure that the correct information is retrieved. Without the single sign-on data store 60, authorization information would be retrieved from the second set 80 of authorization data stores. If any ambiguity existed among the authorization information in the data stores 82, 84, and 86, it is possible that authorization information for an incorrect user 20 or for an incorrect role for a user 20 could be retrieved.

In an embodiment, the user IDs in the single sign-on data store 60 can be mapped to the user IDs in the set of authentication data stores 50 to ensure that the set of authentication data stores 50 uses the same user IDs as the single sign-on data store 60. This can provide further assurance that the authentication and authorization information used for a particular user 20 or a particular role is correct.

In an embodiment, the single sign-on data store 60 is implemented using a Siemens DirX LDAP server, the main internal authorization data store 82 is implemented using Microsoft Metadirectory Services (MMS), the main external authorization data store 84 is implemented using an Oracle database, and the other authorization data store 86 uses neither Siemens DirX, Microsoft Metadirectory Services, nor Oracle. The following discussion will focus on those types of data stores but one of skill in the art will recognize that a similar discussion would apply to other types of data stores.

Since each data store 82, 84, and 86 uses a different data storage protocol, a different approach to transferring data into the single sign-on data store 60 is needed for each of the individual data stores 82, 84, and 86. For the main internal data store 82, a method for transferring data from an MMS LDAP to a Siemens DirX LDAP is needed. In an embodiment, a script or software routine within the synchronization process 70 reads data from the MMS LDAP 82, converts the data into data compatible with the Siemens DirX LDAP 60, then writes the data to the Siemens DirX LDAP 60. As a first step, attribute names in the MMS LDAP 82 are converted into attribute names in the Siemens DirX LDAP 60. Data elements associated with each attribute in the MMS LDAP 82 are then converted into data elements that are associated with the converted attribute names in the Siemens DirX LDAP 60. In an embodiment, the Java Naming and Directory Interface (JNDI) application programming interface is used to connect the MMS LDAP 82 to the Siemens DirX LDAP 60. The JNDI can search for all user-related information in the MMS LDAP 82 and transfer the information to the Siemens DirX LDAP 60.

In an embodiment, intelligence can be built into the script or software routine within the synchronization process 70 so that the script or software routine transfers only the information in the MMS LDAP 82 that was modified since the previous time the routine was run. Whenever a record in the MMS LDAP 82 is modified, the date of the modification can be stored with the record in the MMS LDAP 82. Whenever a record is transferred into the Siemens DirX LDAP 60, the date of the transfer can be stored with the record in the Siemens DirX LDAP 60. When the synchronization process 70 is run, a record is transferred from the MMS LDAP 82 to the Siemens DirX LDAP 60 only if the modification date in the MMS LDAP 82 is later than the transfer date in the Siemens DirX LDAP 60. Thus, the first time the synchronization process 70 is run, all user records are transferred from the MMS LDAP 82 to the Siemens DirX LDAP 60. Thereafter, only the records that have been modified are transferred.

For the main external data store 84, a method for transferring data from an Oracle database to a Siemens DirX LDAP is needed. In an embodiment, a first step in accomplishing this is the creation by a script or other software routine within the synchronization process 70 of an attributes map that correlates the attributes of the user records in the Oracle database 84 into attributes in the Siemens DirX LDAP 60. Next, a connection is established between the Oracle database 84 and the Siemens DirX LDAP 60 by means of Java Database Connectivity. The synchronization process 70 then uses Structured Query Language to retrieve from the Oracle database 84 any user records that have been modified since the previous time the synchronization process 70 was run. These records are then converted, by means of the attributes map, into data that is compatible with the Siemens DirX LDAP 60. The converted records are stored in a file from which they can be read into the Siemens DirX LDAP 60 one at a time. If the Siemens DirX LDAP 60 does not contain any records for a particular user listed in the file, a new record is created. If a record already exists, it will be updated.

Other data stores 86 that do not use MMS LDAP or Oracle may each require a custom approach for transferring data to the Siemens DirX LDAP 60. In an embodiment, a single, repeatable transfer process within the synchronization process 70 is used for each such data store 86. A template is created with fields for the information that will be needed by the Siemens DirX LDAP 60. A script or other software routine within the synchronization process 70 retrieves the relevant data from each miscellaneous data store 86 and inserts the data into the template. The software routine then reads the data from the completed template and inserts the data into the Siemens DirX LDAP 60.

Figure 2:
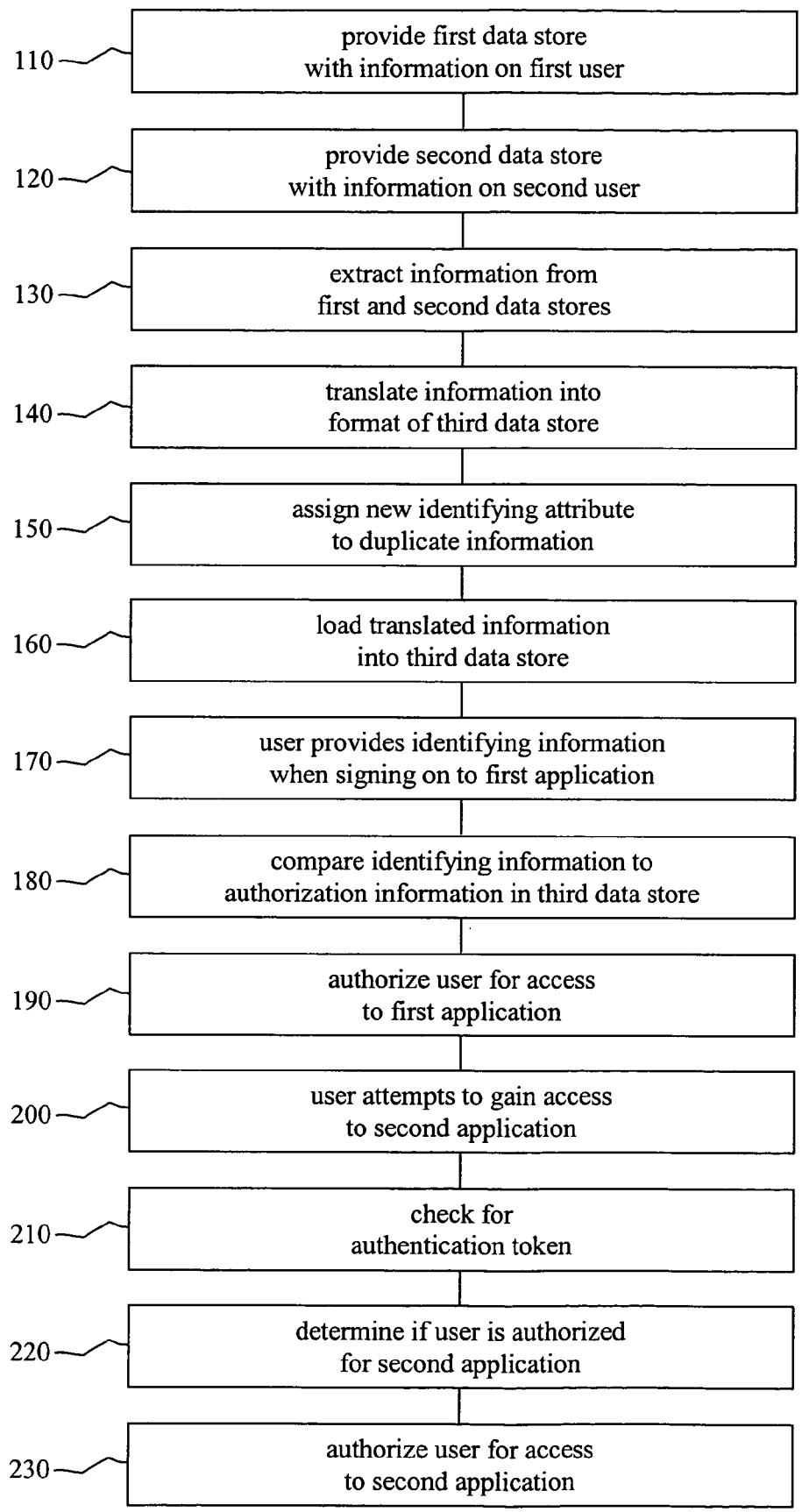
FIG. 2 is a flowchart of a method for gaining access to multiple applications through a single sign-on data store according to one embodiment of the present disclosure.

FIG. 2 illustrates a method for providing a single sign-on capability to multiple applications. In box 110, a first data store is provided. This data store might contain information on internal users within an enterprise such as employees and contractors. In box 120, a second data store is provided. This data store might contain information on users external to an enterprise such as customers. In another embodiment, contractors might be considered external, rather than internal, users. The information in the first and second data stores would typically include an identifying attribute for each user, such as a user ID number, as well as authorization information specifying the applications to which each user is allowed access and the roles each user is allowed to hold in each application.

In box 130, authorization information is extracted from the first and second data stores and, in box 140, the information is translated from the formats of the first and second data stores into the format of a third data store. In box 150, if an identifying attribute for a record in the first or second data stores is found to be a duplicate of an identifying attribute for another record in the first or second data stores, a new identifying attribute is assigned to one of the records. In another embodiment, the assignment of a new identifying attribute could occur before the translation process of box 140. The translated information, including any new identifying attributes, is loaded into the third data store in box 160. At this point, the third data store contains authorization information for all users in the first and second data stores and each user in the third data store has a unique identifying attribute.

In box 170, a user attempting to gain access to a first application provides identifying information, such as a user ID and a password, to the application. In an embodiment, the identifying information might be passed on to a policy server, such as the SiteMinder policy server, and the policy server might authenticate the user. A session cookie or some other type of token might be created at this point to indicate that the user has been authenticated. In box 180, the identifying information is compared to authorization information in the third data store to determine whether the user is authorized to gain access to the requested application. If the user is authorized, the user is given access to the application in box 190.

In box 200, the user attempts to gain access to a second application. In box 210, the policy server checks whether a token exists indicating that the user has been authenticated. In box 220, if the authentication token exists, the policy server determines whether the user is authorized to gain access to the second application. If the user is authorized, the user is given access to the second application in box 230.

Figure 3:
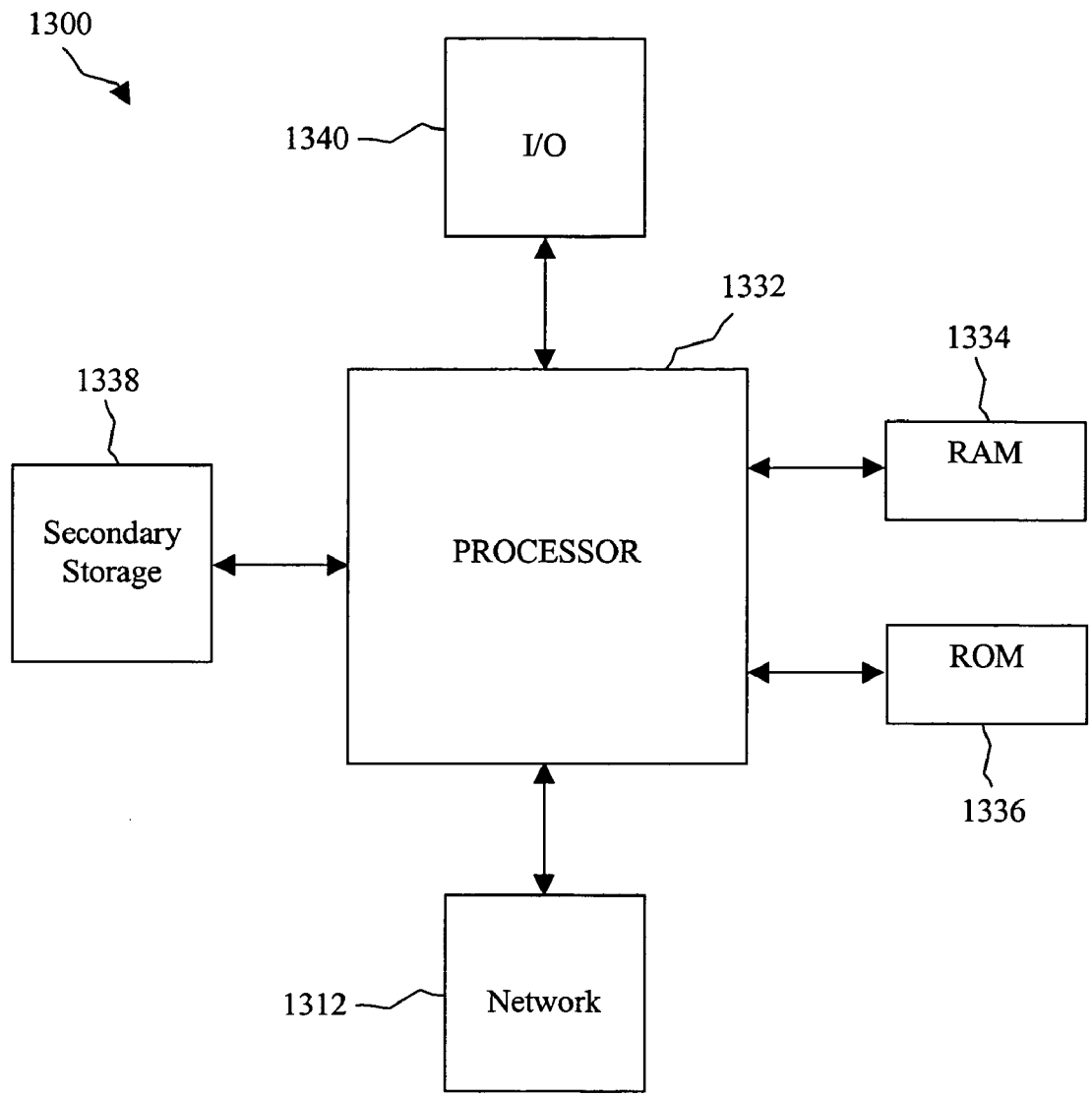
FIG. 3 is a block diagram of a computer system operable for some of the various embodiments of the present disclosure.

A single sign-on database as described above may generally be implemented on a variety of different computer systems. FIG. 3 illustrates a typical, general-purpose computer system suitable for implementing the present invention. The computer system 1300 includes a processor 1332 (also referred to as a central processing unit or CPU) that is coupled to memory devices including primary storage devices 1336 (typically a read only memory, or ROM) and primary storage devices 1334 (typically a random access memory or RAM).

As is well known in the art, ROM acts to transfer data and instructions uni-directionally to CPU 1332, while RAM is used typically to transfer data and instructions in a bi-directional manner. Both storage devices 1334 and 1336 may include any suitable computer-readable media. A secondary storage medium 1338, which is typically a mass memory device, is also coupled bi-directionally to CPU 1332 and provides additional data storage capacity. The mass memory device 1338 is a computer-readable medium that may be used to store programs including computer code, data, and the like. Typically, mass memory device 1338 is a storage medium such as a non-volatile memory such as a hard disk or a tape which is generally slower than primary storage devices 1334 and 1336. Mass memory storage device 1338 may take the form of a magnetic or paper tape reader or some other well-known device. It will be appreciated that the information retained within the mass memory device 1338 may, in appropriate cases, be incorporated in standard fashion as part of RAM 1334 as virtual memory. A specific primary storage device 1334 such as a CD-ROM may also pass data uni-directionally to the CPU 1332.

CPU 1332 is also coupled to one or more input/output devices 1340 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1332 optionally may be coupled to a computer or telecommunications network, e.g., an internet network, or an intranet network, using a network connection as shown generally at 1312. With such a network connection, it is contemplated that CPU 1332 might receive information from the network, or might output information to the network in the course of performing the above-described method steps. Such information, which is often represented as a sequence of instructions to be executed using CPU 1332, may be received from and outputted to the network, for example, in the form of a computer data signal embodied in a carrier wave. The above-described devices and materials will be familiar to those of skill in the computer hardware and software arts.

In one embodiment, sequences of instructions may be executed substantially simultaneously on multiple CPUs, as for example a CPU in communication across network connections. Specifically, the above-described method steps may be performed across a computer network. Additionally, it will be recognized by one of skill in the art that the above method steps may be recognized as sets of computer codes and that such computer codes are typically stored in computer readable media such as RAM, ROM, hard discs, floppy discs, carrier waves, and the like.

While several embodiments have been provided in the present disclosure, it should be understood that the Single Sign-on Database may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each but may still be indirectly coupled and in communication, whether electrically, mechanically, or otherwise, with one another. Other examples of changes, substitutions, and alterations are ascertainable by one skilled in the art and could be made without departing from the spirit and scope disclosed herein.

What is claimed is:

1. A system for single sign-on for enterprise applications, comprising:
    a plurality of enterprise applications;
    a policy server that receives a user's single sign-on information regarding access to a first enterprise application and promotes communication of authentication and authorization information for the first enterprise application to determine the user's access to the first enterprise application, the policy server, regarding the user accessing a second enterprise application, authenticates the user based on the user's single sign-on information and uses the single sign-on information to obtain authorization information for the second enterprise application to determine the user's access to the second enterprise application;
    an authentication data store maintaining the authentication information used by the policy server related to user authentication for at least some of the plurality of enterprise applications;
    a first internal authorization data store maintaining internal authorization information related to internal user;
    a second external authorization data store maintaining external authorization information related to external user;
    a consolidated data store maintaining consolidated authorization information including both the internal and external user authorization information used by the policy server related to user authorization for at least some of the plurality of enterprise applications; and
    a synchronization component that synchronizes the internal and external authorization information from the first internal and second external authorization data stores, respectively, to the consolidated data store.

2. The system of claim 1, wherein the authentication data store includes a first data store of maintaining internal user authentication information and a second data store maintaining external user authentication information.

3. The system of claim 1, wherein internal user authorization information includes employee information and the external user authorization information includes contractor information.

4. The system of claim 3, wherein the synchronization component synchronizes the internal and external user authorization information to the consolidated data store such that user information duplicated in both the first internal and second external authorization data stores is consolidated in the consolidated data store.

5. The system of claim 4, wherein the authentication information includes a user name and password.

6. The system of claim 4, wherein the internal and external user authorization information includes role information.

7. The system of claim 6, wherein the role information is used by the enterprise applications to determine access levels within the enterprise applications.

8. The system of claim 1, wherein the first internal authorization data store is further defined as a Microsoft Metadirectory Services LDAP, wherein the second external authorization data store is further defined as an Oracle database, and wherein the consolidated data store is further defined as Siemens DirX LDAP.

9. The system of claim 8, wherein the synchronization component includes a Java Naming and Directory Interface application programming interface to promote communication between the Microsoft Metadirectory Services LDAP and the Siemens, and wherein a Java Database Connectivity connection is established between the Oracle database and the Siemens DirX LDAP and communication of data is accomplished via Structured Query Language.

10. The system of claim 1, wherein the first internal and second external authorization data stores are periodically updated from a human resource system.

11. The system of claim 1, further comprising a security agent on a user system that communicates with the plurality of enterprise applications and provides authentication information to the enterprise applications.

12. The system of claim 11, wherein the security agent stores at least some authentication information locally on the user system, such that upon selection by the user of the second enterprise application, the security agent determines, via the locally stored at least some authentication information, whether the user has been authenticated.

13. The system of claim 12, wherein the authentication information is stored in a cookie on the user system.

14. The system of claim 12, above wherein the policy server uses the authentication information stored locally on the user system and communicates with the consolidated data store to obtain internal and external authorization information related to the user, the second enterprise application using at least one of the internal and external authorization information obtained by the policy server to determine the user's authorization of the second enterprise application.

15. The system of claim 1, wherein the policy server is further defined as a Siteminder policy server.

16. The system of claim 1, wherein the plurality of enterprise applications are further defined as web-based applications.

17. A method for providing a single sign-on capability for a plurality of computing applications comprising:
    providing a first data store containing information on a first user of a first computing application;
    providing a second data store containing information on a second user of a second computing application;
    extracting information from the first and second data stores;
    translating the information from a format of the first data store and a format of the second data store into a format of a third data store;
    when a duplication exists between an identifying attribute for a record from the first data store and an identifying attribute for a record from the second data store, assigning a new identifying attribute to the record from the first data store;

loading the translated information into the third data store;

a user providing identifying information when the user attempts to gain access to the first computing application;

comparing the identifying information provided by the user with authorization information in the third data store and authentication information in a fourth data store regarding the user's authority to access the first computing application;

authorizing the user for access to the first computing application;

when a user attempts to gain access to the second computing application, retrieving, without further action from the user, the identifying information provided by the user and comparing the identifying information provided by the user with authorization information in the third data store regarding the user's authority to access the second computing application; and authorizing the user for access to the second computing application.

18. The method of claim 17, wherein a policy server promoted retrieval of the authorization information in the third data store and authentication information in a fourth data store.

19. The method of claim 18, wherein the policy server is further defined as a Siteminder policy server.

20. The method of claim 17, wherein the first and second computing applications are further defined as web-based enterprise applications.

21. A system for allowing access to a plurality of web applications through a single sign-on comprising:

a first data store that contains authorization information on a first user of at least one computing application;

a second data store that contains authorization information on a second user of the at least one computing application;

a third data store that contains authorization information on the first and second users;

a fourth data store that maintains authentication information related to access to the computing applications;

a synchronization component that translates information from a format of the first data store and a format of the second data store into a format of a third data store, and, when a duplication exists between an identifying attribute for a record from the first data store and an identifying attribute for a record from the second data store, the synchronization component assigns a single identifying attribute to the record and promotes loading the translated information into the third data store; and a policy server component using identifying information provided by a user signing on to a first computing application to compare to authorization information in the third data store and to compare to authentication information in the fourth data store to determine the user's access to the first computing application, and, when the user attempts to gain access to a second computing application, the policy server compares the identifying information to authorization information in the third data store without further action from the user to determine the user's access to the second computing application.

22. The system of claim 21, further comprising a security agent provided on a user computer to communicate with the computing applications and the policy server, the security agent stores a token based on the prior authentication information and accesses the token to authenticate the user for the second computing application instead of the authentication information stored maintained in the fourth data store.

* * * * *